(12) United States Patent
Tamura et al.

(10) Patent No.: US 9,175,128 B2
(45) Date of Patent: Nov. 3, 2015

(54) INFRARED ABSORBING SPECTACLE LENS AND METHOD FOR PRODUCING SUCH LENS

(75) Inventors: Kanichi Tamura, Osaka (JP); Shoichi Mitsuuchi, Kanan (JP); Kenzo Wada, Kashiwara (JP)

(73) Assignee: TALEX OPTICAL CO., LTD., Osaka (JP)

( * ) Notice: Subject to any disclaimer, the term of this patent is extended or adjusted under 35 U.S.C. 154(b) by 1037 days.

(21) Appl. No.: 12/450,692

(22) PCT Filed: Apr. 9, 2008

(86) PCT No.: PCT/JP2008/057000
§ 371 (c)(1),
(2), (4) Date: Oct. 7, 2009

(87) PCT Pub. No.: WO2008/133008
PCT Pub. Date: Nov. 6, 2008

(65) Prior Publication Data
US 2010/0118263 A1    May 13, 2010

(30) Foreign Application Priority Data

Apr. 13, 2007  (JP) ................................ 2007-105999
Jun. 29, 2007  (JP) ................................ 2007-171580

(51) Int. Cl.
```
G02B 3/00       (2006.01)
C08G 18/48      (2006.01)
C08G 18/10      (2006.01)
C08G 18/12      (2006.01)
C08G 18/42      (2006.01)
C08G 18/66      (2006.01)
C08G 18/75      (2006.01)
C08G 18/76      (2006.01)
G02B 1/04       (2006.01)
G02C 7/12       (2006.01)
G02C 7/10       (2006.01)
G02B 5/20       (2006.01)
G02B 5/22       (2006.01)
```

(52) U.S. Cl.
CPC ............ *C08G 18/4854* (2013.01); *C08G 18/10* (2013.01); *C08G 18/12* (2013.01); *C08G 18/4238* (2013.01); *C08G 18/6677* (2013.01); *C08G 18/755* (2013.01); *C08G 18/758* (2013.01); *C08G 18/7621* (2013.01); *G02B 1/041* (2013.01); *G02C 7/104* (2013.01); *G02C 7/108* (2013.01); *G02C 7/12* (2013.01); *G02B 5/208* (2013.01); *G02B 5/22* (2013.01)

(58) Field of Classification Search
CPC .......... G02C 7/10; B29D 11/00; C08G 18/10; C08F 236/10; C08F 112/08; C08F 8/04; C08C 19/02
USPC ................. 359/642; 528/63, 44, 64; 264/1.1; 525/332.9
See application file for complete search history.

(56) References Cited

U.S. PATENT DOCUMENTS

```
5,686,639   A  * 11/1997  Cohen ............................ 556/33
5,922,246   A     7/1999  Matsushita et al.
6,486,262   B1 * 11/2002  Suzuki et al. ............... 525/332.9
2002/0068809 A1 *  6/2002  Tamura et al. .................. 528/63
2003/0195323 A1 * 10/2003  Tamura et al. .................. 528/44
2006/0199105 A1 *  9/2006  Cahill ....................... 430/270.11
2007/0001567 A1 *  1/2007  D'Haene et al. .............. 313/112
```

FOREIGN PATENT DOCUMENTS

```
JP      6-324293    11/1994
JP      9-43550      2/1997
JP     2002-187931   7/2002
JP     2003-107412   4/2003
JP     2003107412 * 4/2003
JP     2003-301025  10/2003
JP     2005-043921   2/2005
```

* cited by examiner

*Primary Examiner* — Monique Peets
(74) *Attorney, Agent, or Firm* — Wenderoth, Lind & Ponack, L.L.P.

(57) ABSTRACT

The invention is directed to a spectacle lens which contains an infrared absorbing agent, and which shows excellent infrared absorbing properties by minimizing deterioration and decomposition of the infrared absorbing agent, and as well as a method of producing such an optical lens. This infrared absorbing spectacle lens is formed by adding an infrared absorbing dye to a polyurethane resin obtained by addition polymerization of a prepolymer produced by reacting a polyisocyanate with a polyhydroxy compound, and an aromatic polyamine. The lens shows excellent infrared absorbing properties with no deterioration or decomposition of the infrared absorbing agent. It is possible to prevent deterioration of the infrared absorbing agent due to additives such as peroxides (including polymerization catalysts and initiators such as benzoyl peroxide), as well as increased absorption of visible light, which was difficult with conventional resin materials for molding. Also, because this lens can be molded at a relatively low temperature and it is not necessary to mold it at a temperature exceeding 250° C. as in the prior art, the infrared absorbing agent is less likely to deteriorate by heating.

8 Claims, 4 Drawing Sheets

INFRARED ABSORBING SPECTACLE LENS AND METHOD FOR PRODUCING SUCH LENS

This application is a U.S. national stage of International Application No. PCT/JP2008/057000 filed Apr. 9, 2008.

TECHNICAL FIELD

This invention relates to an infrared absorbing spectacle lens and a method for producing such a lens.

BACKGROUND ART

Eyeglasses not only serve to correct eyesight but are beneficial to protect eye cells from harmful light rays. Ultraviolet absorbing spectacle lenses containing ultraviolet absorbing agents that prevent transmission of ultraviolet rays are used for many eye protective gears, such as sunglasses and light-shielding eyeglasses.

Harmful light rays that should be blocked with such spectacle lenses include not only ultraviolet rays but infrared rays.

Of infrared rays, electromagnetic waves having a wavelength of 780 to 1300 nm, which are invisible, are called near-infrared rays, and electromagnetic waves having a wavelength of 1300 to 2000 nm, which are also invisible, are called middle-infrared rays. These infrared rays could penetrate the skin to the depth of as far as 30 mm. In particular, near-infrared rays could penetrate the cornea and almost reach the retina, thereby damaging the fundus oculi.

Eyes will suffer from thermal burns not only when momentarily exposed to intense infrared rays but also when infrared ray damage is accumulated over time, thus causing e.g. retinopathy and opaqueness of the crystalline lens (cataract).

Ordinary known infrared absorbing dyes that block transmission of infrared rays, i.e. dyes that can absorb infrared rays (which are also called infrared absorbing agents) include azo, aminium, anthraquinone, cyanine, polymethine, diphenylmethane, triphenylmethane, quinine, diimmonium, dithiol metal complex, squarylium, phthalocyanine and naphthalocyanine.

An infrared absorbing filter is known which includes an infrared absorbing layer formed by applying and drying a solvent-containing coating solution containing a resin composition comprising one or more of the above-mentioned infrared absorbing agents dispersed in a binder resin (Patent document 1).

A spectacle lens is also known which comprises a synthetic resin substrate having excellent optical properties as spectacle lenses, such as polycarbonate, diethylene glycol bis allyl carbonate (generally called "CR-39"), or polymethyl methacrylate (PMMA), and 0.001 to 0.05% by weight of some of the above-mentioned infrared absorbing agents (Patent document 2).

Patent document 1: JP Patent Publication 2005-43921A
Patent document 2: JP Patent Publication 2003-107412A (claims 2 to 4, paragraphs 0013, 0020, 0022 and 0023).

DISCLOSURE OF THE INVENTION

Object of the Invention

Of the above-mentioned conventional spectacle lenses, the coating layer of infrared absorbing agents formed on the spectacle lens has to be as thin as possible in order not to lower the inherent optical properties of the spectacle lens. This makes it difficult to ensure desired infrared absorbing properties.

General-purpose molded articles can be produced by hot-melting and molding a thermoplastic resin in which infrared absorbing agents are dispersed. But such articles tend to suffer distortion, and also, it is difficult to sufficiently filter out foreign matter. Thus, this method is not suitable for producing high-quality spectacle lenses.

This is because while as thermoplastic resins for eyeglasses, MMA (methylmethaacrylate resin) and PC (polycarbonate resin), which are highly transparent, are preferentially used, MMS is not practical because its impact resistance is low, and PC needs a molding temperature of not less than 250° C. if it has a molecular weight at which it shows sufficient impact resistance, and at such high temperature, infrared absorbing agents will deteriorate and decompose.

CR-39, which is a typical cast type setting resin used as plastic spectacle lenses, and intermediate refractive index resins (such as CORPOREX made by NOF Corporation; Refractive index: 1.56) contain allyl diglycol carbonate. They are anaerobic thermosetting resins which are hardened using diisopropyl peroxydicarbonate (hereinafter abbreviated to "IPP") as a catalyst. Since IPP as a catalyst is a peroxide, infrared absorbing agents react with this peroxide and deteriorate and decompose, thus losing their infrared absorbing properties.

Known high refractive index resins (such as thiourethane resin MR-7 made by Mitsui Chemicals, Inc.) are resins obtained by compounding isocyanate and polythiol. Infrared absorbing agents react with sulfur components or catalysts, and deteriorate and decompose, thereby making it impossible to obtain sufficient infrared repelling function.

An object of the present invention is to provide a spectacle lens which contains an infrared absorbing agent, which is free of the above-mentioned problems, and which shows excellent infrared absorbing properties by minimizing deterioration and decomposition of the infrared absorbing agent, and to provide a method of producing such an optical lens.

Means to Achieve the Object

The inventors of the present application discovered, based on data obtained from numeral experiments, that a lens formed by adding an infrared absorbing agent to a polyurethane resin composition obtained by addition polymerization of a prepolymer obtained by reacting a polyhydroxy compound with an cycloaliphatic polyisocyanate, and an aromatic polyamine as a cross-linking agent shows excellent infrared absorbing properties without deterioration and decomposition of the infrared absorbing agent, and completed this invention based on this discovery.

Thus, in order to achieve the above-mentioned object, the present invention provides an infrared absorbing spectacle lens made of a resin composition comprising a polyurethane resin composition obtained by addition polymerization of a prepolymer and an aromatic polyamine, wherein the prepolymer is a reaction product of a polyisocyanate and a polyhydroxy compound, and wherein the resin composition contains an infrared absorbing dye.

Since an infrared absorbing agent and a predetermined polyurethane resin composition are used in combination in the infrared absorbing spectacle lens according to the present invention, it is possible to prevent deterioration of the infrared absorbing agent due to additives such as peroxides (including polymerization catalysts and initiators such as benzoyl peroxide), as well as increased absorption of visible light, which was difficult with conventional resin materials for molding. Also, because the lens according to the present invention can be molded at a relatively low temperature and it is not necessary to mold it at a temperature exceeding 250° C. as in the prior art, the infrared absorbing agent is less likely to deteriorate by heating.

That is, the above-mentioned polyurethane resin composition is polymerized by adding atom groups having isocyanate groups, which can be easily added, to a bifunctional compound, without the need for polymerization catalysts or initiators of peroxide types. Thus, it was discovered that by using this resin composition, the infrared absorbing agent does not deteriorate during cast molding of the spectacle lens and the later curing.

Preferably, the infrared absorbing dye is added to the polyurethane resin composition such that the average transmission of infrared rays having wavelengths in the range of 780 to 2500 nm is not more than 30%.

Preferably, the spectacle lens further comprises an ultraviolet absorbing agent capable of absorbing ultraviolet rays having wavelengths of not more than 400 nm.

To improve the transparency and impact resistance of the spectacle lens according to the present invention, the polyisocyanate is preferably one of 4,4'-methylene-bis(cyclohexylisocyanate) and isophorone diisocyanate. Also preferably, the polyhydroxy compound is a polyether diol or a polyester diol having an average molecular weight of 700-1200, or a mixture thereof. Further preferably, the aromatic polyamine is 4,4'-methylene-bis(2-chloroaniline).

In order to further improve the impact resistance of the spectacle lens according to the present invention, the polyisocyanate and the polyhydroxy compound are preferably added such that the reaction molar ratio (NCO/OH) is 2.5 to 4.0 and the NCO content of the polyurethane prepolymer obtained is 7.0 to 14.0%.

The spectacle lens according to the present invention may be a transparent lens, a colored lens or a polarized lens. Also, according to the intended use, the spectacle lens according to the present invention may be a sunglass lens, polarized spectacle lens or a shield lens for use in goggles. The shield lens for use in goggles may be in the form of a flat plate, a sheet or an eye cap.

From another aspect, the present invention provides a method of producing an infrared absorbing spectacle lens comprising the steps of mixing a polyisocyanate and a polyhydroxy compound such that the molar ratio (NCO/OH) is 2.5 to 4.0 to obtain a polyurethane prepolymer having an NCO content of 7.0 to 14.0%, mixing the polyurethane prepolymer and an aromatic polyamine such that the reaction molar ratio (NCO/NH$_2$) is 1.10 to 0.90, adding an infrared absorbing dye to the thus obtained mixture, casting the mixture, and curing the mixture at 60 to 140° C.

Since the infrared absorbing spectacle lens according to the present invention is made of a resin composition comprising a polyurethane resin composition obtained by addition polymerization of a prepolymer and an aromatic polyamine, wherein the prepolymer is a reaction product of a polyisocyanate and a polyhydroxy compound, and wherein the resin composition contains an infrared absorbing dye, the infrared absorbing agent never deteriorates or decomposes, so that the spectacle lens shows excellent infrared absorbing properties.

In the method of producing an infrared absorbing spectacle lens according to the present invention, which comprises the steps of mixing predetermined amounts of a polyisocyanate and a polyhydroxy compound such that the molar ratio (NCO/OH) is 2.5 to 4.0 to obtain a predetermined amount of a polyurethane prepolymer having an NCO content of 7.0 to 14.0%, mixing the polyurethane prepolymer and an aromatic polyamine such that the reaction molar ratio (NCO/NH$_2$) is 1.10 to 0.90, adding an infrared absorbing dye to the thus obtained mixture, casting the mixture, and curing the mixture at 60 to 140° C., the infrared absorbing agent never deteriorates or decomposes, so that the spectacle lens thus formed shows excellent infrared absorbing properties.

BEST MODE FOR EMBODYING THE INVENTION

Figure 1:
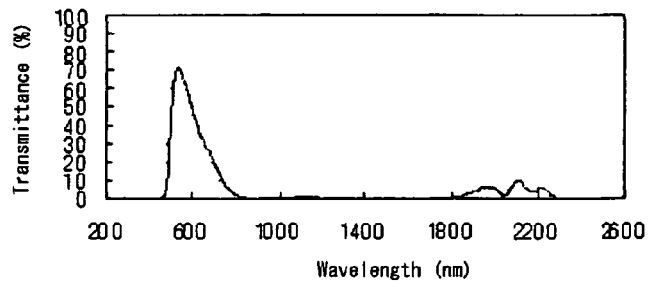
FIG. 1 is a near-infrared spectrum chart of Example 1.

The polyisocyanate used in this invention is preferably 4,4'-methylenebis(cyclohexylisocyanate), or isophorone diisocyanate, which are cycloaliphatic diisocyanates.

Other polyisocyanates include hexa methylene diisocyanate, trimethylhexamethylene diisocyanate, hydrogenated XDI, and norbornane diisocyanate. But if these substances are used, it is difficult to ensure a sufficiently long pot life of the urethane resin obtained.

The polyhydroxy compound used in this invention is a polyether diol or a polyester diol having an average molecular weight of 700-1200, or a mixture thereof.

As the polyether diol, it is possible to use polyoxytetramethylene glycol, which is obtained by subjecting tetrahydrofuran to ring-opening polymerization, or any other polyether diols. As the polyester diol, it is possible to use any known polyesters, but 1,4-butanediol adipate or 1,6-hexanediol adipate are preferable.

Among prepolymers obtained by reacting with diisocyanates, a prepolymer obtained from polyether diol has a lower viscosity and thus is advantageous for casting. Thus, among polyhydroxy compounds usable in this invention, polyether diol is especially preferable.

In order to improve the hardness and chemical resistance, an aliphatic polyol having a molecular weight of not more than 300 may be added. Such aliphatic polyols include diols such as ethylene glycol, diethylene glycol, propylene glycol and 1,4-butanediol, and triols such as trimethylolethane and trimethylolpropane.

Typical aromatic polyamines that are preferably used in this invention include aromatic diamines, of which 4,4'-methylene-bis(2-chloroaniline) is especially preferable because of its long pot life during molding. But other known aromatic polyamines may be used too. If the pot life is short when using an aromatic polyamine, care has to be taken to e.g. finish molding quickly.

The above-mentioned known aromatic diamines include aromatic monocyclic diamines such as 2,4-diamino-3,5-diethyl toluene, 2,6-diamino-3,5-diethyl toluene, and aromatic polycyclic diamines such as 4,4'-methylene-bis(2,6-diisopropylaniline), 4,4'-methylene-bis(2,6-dimethyl-aniline), 4,4'-methylene-bis(2-ethyl-6-methylaniline), 4,4'-methylene-bis(2-6-diethylaniline), 4,4'-methylene-bis(2-isopropyl-6-methylaniline), and 4,4'-methylene-bis(3-chloro-2,6-diethylaniline).

When producing a prepolymer by reacting polyisocyanate with a polyhydroxy compound in the present invention, preferably, the reaction molar ratio (NCO/OH) is 2.5 to 4.0 and the NCO content of the prepolymer obtained is 7.0 to 14.0%. If the reaction molar ratio and the NCO content are lower than the above respective ranges, the viscosity of the prepolymer is too high and casting becomes difficult. The hardness is low, too. If these values are higher than the above respective ranges, the curing physical properties deteriorate.

The mixture molar ratio (NCO/NH2) of the prepolymer and aromatic polyamine of the present invention is 1.10 to 0.90, and it is possible to use known curing treatment conditions.

Infrared absorbing agents should be ones capable of absorbing infrared rays having wavelengths in the range of 780 to 2500 nm. It is possible to use known infrared absorbing dyes. Such infrared absorbing agents include the following.
(1) Infrared absorbing agents comprising N,N,N',N'-tetrakis (p-substituted phenyl)-p-phenylene diamines, benzenes, and their aluminum salts, and diimmonium salts.
(2) N,N,N',N'-tetraaryl quinone diimmonium salts.
(3) Bis-(p-dialkylaminophenyl)[N, N-bis(p-dialkylaminophenyl)p-aminophenyl] aminium salts.

Ultraviolet absorbing agents that can be used as necessary include the following.
(1) 2-hydroxy-4-n-octoxybenzophenone
(2) 4-dodecyloxy-2-hydroxybenzophenone
(3) 2-2'-hydroxy-4-methoxybenzophenone When using such ultraviolet absorbing agents, it is preferable to absorb all types of ultraviolet rays including UV-A, having long wavelengths (315 to 400 nm), UV-B, having short wavelengths (280 to 315 nm) and UV-C, having further shorter wavelengths (100 to 280 nm).

For example, in order to cut blue flames in welding light, it is necessary to absorb UV rays having wavelengths of 380 to 450 nm. If infrared absorbing agents are used together with a polarizing film, such UV rays can be absorbed without adding a dye. But if a polarizing film is not used, yellow dyes, orange dyes, red dyes or mixtures thereof, which absorb blue colors, are added to the resin.

In order to provide a brownish spectacle lens, yellow dyes, orange dyes, red dyes or their mixtures are used.

In order to dye a polarizing film, water-soluble dyes are preferably used. In order to dye a urethane resin, oil-soluble dyes are preferable.

Dyes include direct dyes, acid dyes, basic dyes, sulfur dyes, disperse dyes and oil-soluble dyes. It is preferable to use dyes that are high in fastness.

Infrared absorbing agents are ordinarily added by 0.05 to 10 parts by weight, and preferably 0.1 to 1.0 parts by weight if used for applications other than a light shield, based on 100 parts by weight of the material forming lenses impact-resistant polyurethane). If used a light shield, the content of the infrared absorbing agents is determined according to the desired infrared absorbing properties.

Ultraviolet absorbing agents are added by 0.01 to 4 parts by weight, preferably 0.1 to 4.0 parts by weight, more preferably 0.2 to 0.5 parts by weight, based on the material forming lenses (impact-resistant urethane).

Preferably, the spectacle lens according to the present invention allows transmission of visible light having wavelengths in the range of 380 to 780 nm with a transmission rate of 1 to 75%, and preferably 10 to 40% if used for applications other than a light shield.

Preferably, the spectacle lens according to the invention allows transmission of ultraviolet rays having wavelengths in the range of 100 nm to 380 nm by less than 0.1%, preferably by less than 0.02%.

By adding ultraviolet absorbing agents, the durability of the infrared absorbing agents improves when the lens is used outdoors.

Preferably, the spectacle lens according to the invention allows transmission of infrared rays having wavelengths in the range of 780 nm to 2500 nm by less 10%, more preferably less than 1%.

But if the lens according to the invention is used as a light shield used during e.g. welding, the above figures should be determined based on the corresponding prescribed standards.

If the spectacle lens is used for applications other than a light shield, its color tone is determined taking into consideration the wearer's tastes and also the fashion factor. But preferably, its color tone is adjusted by adding infrared absorbing agents such that the ratio of the average light transmission rate in the wavelength range of 380 to 550 nm (A %) to the average light transmission rate in the wavelength range of 550 to 780 nm (B %) is not more than 0.3 (A/B≤0.3).

The spectacle lens according to the present invention can be used as a polarized spectacle lens, a sunglass lens, a shield lens or an eye cap for goggles, a helmet shield, etc. The spectacle lens according to the present invention may be a prescription lens such as a convex or concave lens, or a non-prescription spectacle lens. Also, the spectacle lens may be actually not in the form of conventional spectacles but may be a flexible (prescription or non-prescription) sheet or plate or a prescription or non-prescription eye cap.

A goggle is a kind of spectacles worn on the face to protect eyes during sports activities and manual labor. For examples, a goggle is used during swimming, mountain climbing, skiing and biking, and to protect against insects and pollen.

The color tone of the spectacle lens according to the invention may be adjusted according to tastes to individual wearers. But because many of infrared adjusting agents are greenish, the color tone is restricted to some extent. The color tone should be adjusted taking also into consideration the fashion aspect.

An impact-resistant spectacle lens which can be used for a transparent lens, a colored lens or a polarized lens is produced by casting a polyurethane resin composition for casting. For this purpose, it is possible to use any known casting method. If the intended lens is not actually in the shape of a conventional lens, such as a goggle, it can be produced using a mold having the corresponding shape.

In particular, in the casting method, a mold member is used which comprises convex and concave molds liquid-tightly fitted together through a gasket. Monomer is injected into the cavity of the mold member and polymerized and cured. Especially when producing a polarized lens, a polarizing element (such as a polarizing film or sheet) is set in a ring-shaped gasket before fitting together the convex and concave molds of the mold member through the gasket. Then, monomer as a resin material is injected through injection holes formed in the mold member or the gasket so that both sides of the polarizing element is covered with the monomer, and the monomer is polymerized and cured.

A spectacle lens may be subjected to hard coating treatment, in which the lens is immersed in a solution containing e.g. a silicon compound to form a reinforcing film on the lens, thereby increasing its surface hardness. In order to further enhance its performance, the lens may be subjected to anti-fogging treatment, anti-reflective treatment, chemical-resistant treatment, anti-static treatment, mirror treatment, etc.

The spectacle lens thus produced suppresses transmission of harmful rays, i.e. infrared rays and ultraviolet rays, and thus is suitable for use under extremely strong sunlight. People having weak eyesight can also use this spectacle lens to prevent damage to the eyes from harmful rays.

In a work environment where severe visible rays and/or infrared rays are produced, such as in a welding site, it is mandatory to wear eye protectors. Use standards of such eye protectors are specified under JIS T 8141 according to specific work environments. The lens according to the present invention can be used as an eye protecting lens usable in such work environments by adjusting the contents of infrared absorbing agents and coloring materials.

By adjusting various parameters, the spectacle lens according to the present invention can prevent the following (five kinds of) damage to the eyes from harmful rays:
(1) Damage to cornea and conjunctiva from ultraviolet rays UV-B and C
(2) Damage to crystalline lenses from ultraviolet rays UV-A
(3) Photochemical damage to retinas from blue glow
(4) Damage to cornea and crystalline lenses from visible rays and near-infrared rays
(5) Damage to cornea and crystalline lenses from near- and middle-infrared rays

EXAMPLES

In the following examples of the invention and comparative examples, unless otherwise specified, the units "parts" and "%" refer to "parts by weight" and "% by weight", respectively.

Production of Prepolymer

Production Example 1

200 parts of polyoxytetramethylene glycol having an average molecular weight of 1014 (PTG-1000N, made by Hodogaya Chemical Co., Ltd.) was placed in a 500-ml separable flask having a thermometer, stirrer and a nitrogen sealing tube, heated while stirring in a nitrogen stream, and then dehydrated for one hour under a reduced pressure of 100-110° C./3-5 mmHg. After dehydration, 170 parts of 4,4'-methylene-bis(cyclohexylisocyanate) (Desmodule W, made by Sumika Bayer Co., Ltd.) was added, and the mixture was reacted for two hours at 120-130° C. to prepare a prepolymer. The prepolymer thus obtained was a colorless transparent liquid having an NCO content of 9.9% with a viscosity of 8600 mPa·s/30° C., 750 mPa·s/60° C. This prepolymer is hereinafter referred to as "Prepolymer A".

Production Example 2

200 parts of polytetraoxymethylene glycol having an average molecular weight of 1014 and 4 parts of trimethylolpropane were placed in the same separable flask as used in Production Example 1, and dehydrated under the same conditions as in Production Example 1. After dehydration, 190 parts of 4,4'-methylene-bis(cyclohexylisocyanate) was added, and the mixture was reacted for two hours at 120-130° C. to prepare a prepolymer. The prepolymer thus obtained was a substantially colorless transparent liquid having an NCO content of 10.1% with a viscosity of 8000 mPa·s/30° C., 920 mPa·s/60° C. This prepolymer is hereinafter referred to as "Prepolymer B".

Production Example 3

200 parts of polytetraoxymethylene glycol having an average molecular weight of 1014 was placed in the same separable flask as used in Production Example 1, and dehydrated under the same conditions as in Production Example 1. After dehydration, 131 parts of isophorone diisocyanate (Desmodule, made by Bayer) was added, and the mixture was reacted for two hours at 120-130° C. to prepare a prepolymer. The prepolymer thus obtained was a substantially colorless transparent liquid having an NCO content of 9.7% with a viscosity of 6900 mPa·s/30° C., 900 mPa·s/60° C. This prepolymer is hereinafter referred to as "Prepolymer C".

Production Example 4

200 parts of polytetraoxymethylene glycol having an average molecular weight of 1014 and 4 parts of trimethylolpropane were placed in the same separable flask as used in Production Example 1, and dehydrated under the same conditions as in Production Example 1. After dehydration, 155 parts of isophorone diisocyanate was added, and the mixture was reacted for two hours at 120-130° C. to prepare a prepolymer. The prepolymer thus obtained was a substantially colorless transparent liquid having an NCO content of 10.4% with a viscosity of 9400 mPa·s/30° C., 1200 mPa·s/60° C. This prepolymer is hereinafter referred to as "Prepolymer D".

Production Example 5

200 parts of 1,6-hexanediol adipate having an average molecular weight of 1007 (Nippolan 164, made by Nippon Polyurethane Industry Co., Ltd.) was placed in the same separable flask as used in Production Example 1, and dehydrated under the same conditions as in Production Example 1. After dehydration, 170 parts of 4,4'-methylene-bis(cyclohexylisocyanate) was added, and the mixture was reacted for two hours at 120-130° C. to prepare a prepolymer. The prepolymer thus obtained was a substantially colorless transparent liquid having an NCO content of 9.0% with a viscosity of 19000 mPa·s/30° C., 2000 mPa·s/60° C. This prepolymer is hereinafter referred to as "Prepolymer E".

Production Example 6

200 parts of 1,6-hexanediol adipate having an average molecular weight of 1007 and 4 parts of trimethylolpropane were placed in the same separable flask as used in Production Example 1, and dehydrated under the same conditions as in Production Example 1. After dehydration, 199 parts of 4,4'-methylene-bis(cyclohexylisocyanate) was added, and the mixture was reacted for two hours at 120-130° C. to prepare a prepolymer. The prepolymer thus obtained was a substantially colorless transparent liquid having an NCO content of 10.1% with a viscosity of 22000 mPa·s/30° C., 2100 mPa·s/60° C. This prepolymer is hereinafter referred to as "Prepolymer F".

Production Example 7

200 parts of polytetraoxymethylene glycol having an average molecular weight of 1014 was placed in the same separable flask as used in Production Example 1, and dehydrated under the same conditions as in Production Example 1. After dehydration, 104 parts of 4,4'-methylene-bis(cyclohexylisocyanate) was added, and the mixture was reacted for two hours at 120-130° C. to prepare a prepolymer. The prepolymer thus obtained was a substantially colorless transparent liquid having an NCO content of 5.5% with a viscosity of 30000 mPa·s/30° C., 2700 mPa·s/60° C. This prepolymer is hereinafter referred to as "Prepolymer G".

Production Example 8

200 parts of polytetraoxymethylene glycol having an average molecular weight of 1014 was placed in the same separable flask as used in Production Example 1, and dehydrated under the same conditions as in Production Example 1. After dehydration, it was cooled to 80° C., and 103 parts of tolylene diisocyanate (T-80, made by Nippon Polyurethane Industry Co., Ltd.) was added. Then, the mixture was reacted for five hours at 80-85° C. to prepare a prepolymer. The prepolymer thus obtained was a pale yellow transparent liquid having an NCO content of 10.8% with a viscosity of 2000 mPa·s/30° C., 150 mPa·s/60° C. This prepolymer is hereinafter referred to as "Prepolymer H".

Production Example 9

A prepolymer was prepared in the same manner as in Production Example 8 except that tolylene diisocyanate was added by 70 parts. The prepolymer thus obtained was a pale yellow transparent liquid having an NCO content of 6.3% with a viscosity of 7000 mPa·s/30° C., 600 mPa·s/60° C. This prepolymer is hereinafter referred to as "Prepolymer I".

Example 1

100 parts by weight of Prepolymer A obtained in Production Example 1 was heated to 70° C., and a diimmonium compound (IRG-022, made by Nippon Kayaku Co., Ltd.) as an infrared (IR) absorbing agent was added by 0.10 parts by weight and mixed. To this mixture, 31.4 parts by weight of 4,4'-methylene-bis(2-chloroaniline), which had been melted at 120° C., was mixed while degassing. The mixture thus obtained was poured into a mold which had been preheated to 100° C. and cured by heating for 24 hours at 100° C. to obtain a spectacle lens (without using a polarizing film). The mixing mole ratio (NCO/NH2) at this time was 1.0. FIG. 1 shows a near-infrared spectrum chart of this spectacle lens (lens thickness: about 2.6 mm).

The average transmittance of infrared rays in the wavelength range of 780-2500 nm as calculated based on the results of FIG. 1 was 1.35%. (The average transmittance of infrared rays in the wavelength range of 780-1700 nm was 0.30%.) This indicates that this spectacle lens has excellent infrared absorbing properties as desired, with no deterioration of the infrared absorbing agent.

Example 2

Figure 2:
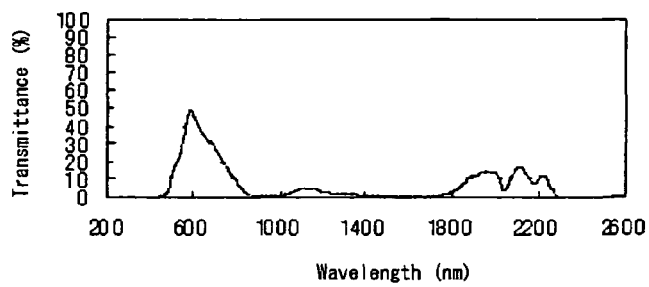
FIG. 2 is a near-infrared spectrum chart of Example 2.

A polarized lens was prepared in exactly the same manner as in Example 1, except that cast molding was carried out with a polarizing film of a reddish color tone (copper 30) sandwiched, and that a diimmonium compound (IRG-022, made by Nippon Kayaku Co., Ltd.) as an infrared absorbing agent was added by 0.13 parts by weight. FIG. 2 shows a near-infrared spectrum chart of this spectacle lens (lens thickness: about 2.0 mm).

The average transmittance of infrared rays in the wavelength range of 780-2500 nm as calculated based on the results of FIG. 2 was 3.93%. (The average transmittance of infrared rays in the wavelength range of 780-1700 nm was 2.27%.) This indicates that this spectacle lens has excellent infrared absorbing properties as desired, with no deterioration of the infrared absorbing agent.

Example 3

Figure 3:
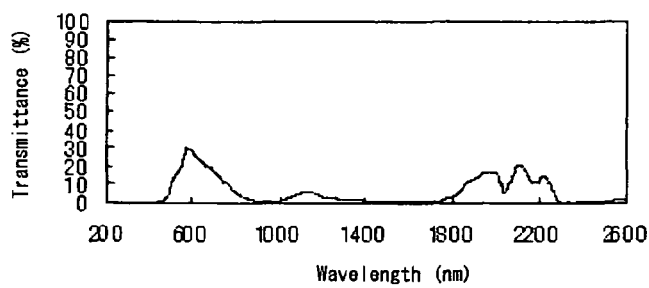
FIG. 3 is a near-infrared spectrum chart of Example 3.

A polarized lens was prepared in exactly the same manner as in Example 1, except that cast molding was carried out with a polarizing film of a reddish color tone (copper 30) sandwiched, and that a diimmonium compound (IRG-022, made by Nippon Kayaku Co., Ltd.) as an infrared absorbing agent was added by 0.15 parts by weight. FIG. 3 shows a near-infrared spectrum chart of this spectacle lens (lens thickness: about 1.7 mm).

The average transmittance of infrared rays in the wavelength range of 780-2500 nm as calculated based on the results of FIG. 3 was 4.79%. (The average transmittance of infrared rays in the wavelength range of 780-1700 nm was 2.27%.) This indicates that this spectacle lens has excellent infrared absorbing properties as desired, with no deterioration of the infrared absorbing agent.

Example 4

Figure 4:
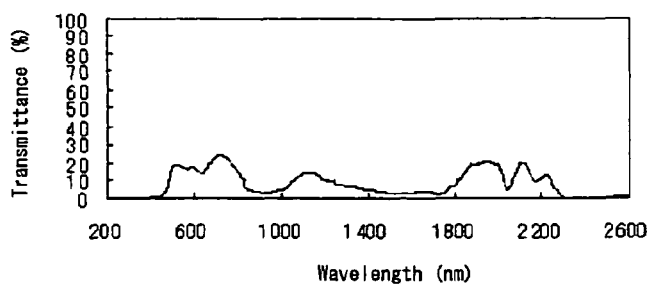
FIG. 4 is a near-infrared spectrum chart of Example 4.

A polarized lens was prepared in exactly the same manner as in Example 1, except that cast molding was carried out with a polarizing film of a grayish color tone (TG-15) sandwiched, and that a diimmonium compound (IRG-022, made by Nippon Kayaku Co., Ltd.) as an infrared absorbing agent was added by 0.10 parts by weight. FIG. 4 shows a near-infrared spectrum chart of this spectacle lens (lens thickness: about 2.0 mm).

The average transmittance of infrared rays in the wavelength range of 780-2500 nm as calculated based on the results of FIG. 4 was 7.63%. (The average transmittance of infrared rays in the wavelength range of 780-1700 nm was 6.66%.) This indicates that this spectacle lens has excellent infrared absorbing properties as desired, with no deterioration of the infrared absorbing agent.

Example 5

Figure 5:
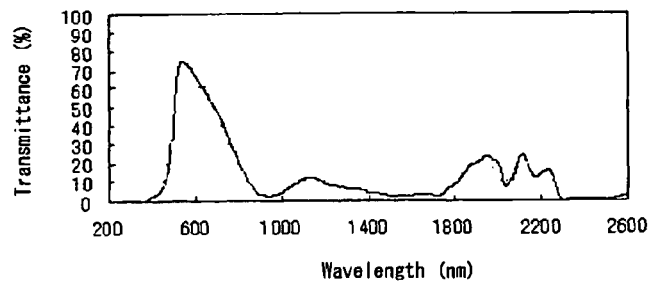
FIG. 5 is a near-infrared spectrum chart of Example 5.

A sheet used for a transparent protective portion (spectacle lens portion) of goggles was prepared in exactly the same manner as in Example 1, except that a diimmonium compound (IRG-022, made by Nippon Kayaku Co., Ltd.) as an infrared absorbing agent was added by 0.20 parts by weight. FIG. 5 shows a near-infrared spectrum chart of this sheet (sheet thickness: about 1.0 mm).

The average transmittance of infrared rays in the wavelength range of 780-2500 nm as calculated based on the results of FIG. 5 was 8.14%. (The average transmittance of infrared rays in the wavelength range of 780-1700 nm was 6.36%.) This indicates that this sheet for goggles has excellent infrared absorbing properties as desired, with no deterioration of the infrared absorbing agent.

Example 6

Figure 6:
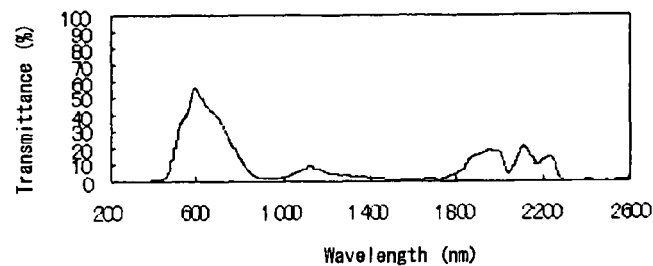
FIG. 6 is a near-infrared spectrum chart of Example 6.

A sheet for goggles was prepared in exactly the same manner as in Example 5, except that cast molding was carried out with a polarizing film of a reddish color tone (copper 50) sandwiched. FIG. 6 shows a near-infrared spectrum chart of this sheet (sheet thickness: about 1.0 mm).

The average transmittance of infrared rays in the wavelength range of 780-2500 nm as calculated based on the results of FIG. 6 was 5.77%. (The average transmittance of infrared rays in the wavelength range of 780-1700 nm was 3.87%.) This indicates that this polarized sheet for goggles has excellent infrared absorbing properties as desired, with no deterioration of the infrared absorbing agent.

Example 7

Figure 7:
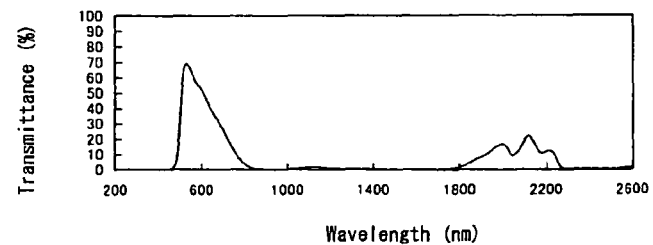
FIG. 7 is a near-infrared spectrum chart of Example 7.

100 parts by weight of Prepolymer A obtained in Production Example 1 was heated to 70° C., and a diimmonium compound (IRG-022, made by Nippon Kayaku Co., Ltd.) as an infrared (IR) absorbing agent was added by 0.10 parts by weight and mixed. To this mixture, 36.5 parts by weight of 4,4'-methylene-bis(2,6-diethylaniline), which had been melted at 120° C., was mixed while degassing. The mixture thus obtained was poured into a mold which had been preheated to 100° C., and molding was quickly completed according to the pot-life of several minutes, and cured by heating for 24 hours at 100° C. to obtain a spectacle lens (without using a polarizing film). FIG. 7 shows a near-infrared spectrum chart of this spectacle lens (lens thickness: about 2.0 mm).

The average transmittance of infrared rays in the wavelength range of 780-2500 nm as calculated based on the results of FIG. 7 was 3.37%. (The average transmittance of infrared rays in the wavelength range of 780-1700 nm was 0.62%.) This indicates that this spectacle lens has excellent infrared absorbing properties as desired, with no deterioration of the infrared absorbing agent.

Example 8

Figure 8:
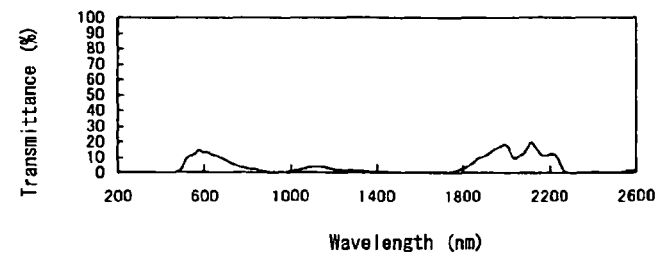
FIG. 8 is a near-infrared spectrum chart of Example 8.

100 parts by weight of Prepolymer A obtained in Production Example 1 was heated to 70° C., and a diimmonium compound (IRG-022, made by Nippon Kayaku Co., Ltd.) as an infrared (IR) absorbing agent was added by 0.10 parts by weight and mixed. To this mixture, 44.6 parts by weight of 4,4'-methylene-bis(3-chloro-2,6-diethylaniline), which had been melted at 120° C., was mixed while degassing. The mixture thus obtained was poured into a mold which had been preheated to 100° C. with a polarizing film of a reddish color tone (copper 30) sandwiched, and cast-molding was carried out quickly. Then, the mixture was cured by heating for 24 hours at 100° C. to obtain a polarized spectacle lens. FIG. 8 shows a near-infrared spectrum chart of this spectacle lens (lens thickness: about 2.2 mm).

The average transmittance of infrared rays in the wavelength range of 780-2500 nm as calculated based on the results of FIG. 8 was 3.95%. (The average transmittance of infrared rays in the wavelength range of 780-1700 nm was 1.35%.) This indicates that this polarized spectacle lens has excellent infrared absorbing properties as desired, with no deterioration of the infrared absorbing agent.

Comparative Example 1

Figure 9:
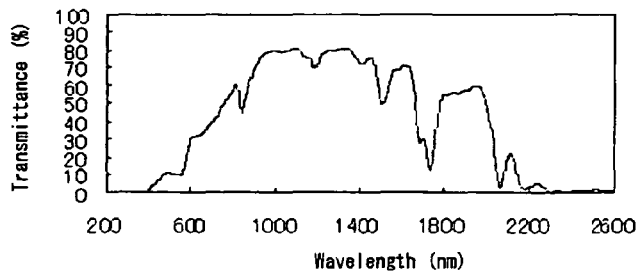
FIG. 9 is a near-infrared spectrum chart of Comparative Example 1.

0.13 parts by weight of a diimmonium compound (IRG-022, made by Nippon Kayaku Co., Ltd.) was added to 100 parts by weight of a high-refractive resin (thiourethane resin MR-7, made by Mitsui Chemicals, Inc.) as a base resin. This mixture was subjected to cast molding with a polarizing film of a reddish color tone (copper 15) sandwiched to obtain a polarized lens. FIG. 9 shows a near-infrared spectrum chart of this polarized spectacle lens (lens thickness: about 2.4 mm).

The average transmittance of infrared rays in the wavelength range of 780-2500 nm as calculated based on the results of FIG. 9 was 47.70%. (The average transmittance of infrared rays in the wavelength range of 780-1700 nm was 70.26%.) This indicates that no desired infrared absorbing properties were obtained because the infrared absorbing agent reacted with sulfur components and deteriorated.

Comparative Example 2

Figure 10:
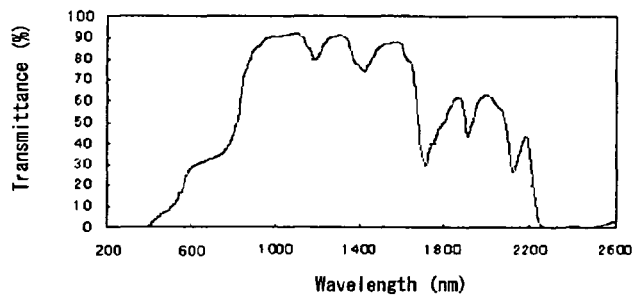
FIG. 10 is a near-infrared spectrum chart of Comparative Example 2.

0.13 parts by weight of a diimmonium compound (IRG-022, made by Nippon Kayaku Co., Ltd.) was added to 100 parts by weight of allyl diglycol carbonate (CR-39) as a base resin. This mixture was subjected to cast molding with a polarizing film of a reddish color tone (copper 15) sandwiched to obtain a polarized lens. FIG. 10 shows a near-infrared spectrum chart of this polarized spectacle lens (lens thickness: about 2.0 mm).

The average transmittance of infrared rays in the wavelength range of 780-2500 nm as calculated based on the results of FIG. 10 was 58.20%. (The average transmittance of infrared rays in the wavelength range of 780-1700 nm was 81.47%.) This indicates that no desired infrared absorbing properties were obtained because the infrared absorbing agent reacted with IPP, which is a peroxide catalyst, and deteriorated.

Comparative Example 3

Figure 11:
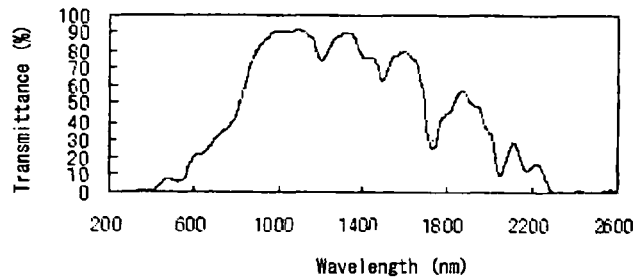
FIG. 11 is a near-infrared spectrum chart of Comparative Example 3.

A polarized lens was produced in exactly the same manner as in Example 1 except that the mold casting was carried out with a polarizing film of a reddish color tone (copper 30) sandwiched, and that no infrared absorbing agent was added. FIG. 11 shows a near-infrared spectrum chart of this polarized spectacle lens (lens thickness: about 2.0 mm).

The average transmittance of infrared rays in the wavelength range of 780-2500 nm as calculated based on the results of FIG. 11 was 52.14%. (The average transmittance of infrared rays in the wavelength range of 780-1700 nm was 78.24%.) This indicates that this spectacle lens has no infrared absorbing ability.

Comparative Example 4

Figure 12:
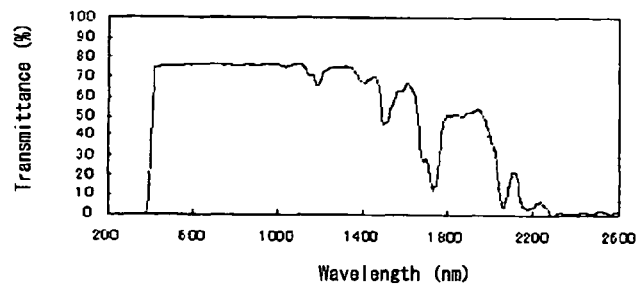
FIG. 12 is a near-infrared spectrum chart of Comparative Example 4.

A spectacle lens was produced in the same manner as in Comparative Example 1 using the same high-refractive resin (thiourethane resin MR-7, made by Mitsui Chemicals, Inc.) as a base resin, except that no infrared absorbing agent was added and cast molding was carried out without using a polarizing film. FIG. 12 shows a near-infrared spectrum chart of this spectacle lens (lens thickness: about 2.3 mm).

The average transmittance of infrared rays in the wavelength range of 780-2500 nm as calculated based on the results of FIG. 12 was 46.39%. (The average transmittance of infrared rays in the wavelength range of 780-1700 nm was 69.09%.) This indicates that no desired infrared absorbing properties were obtained.

Comparative Example 5

Figure 13:
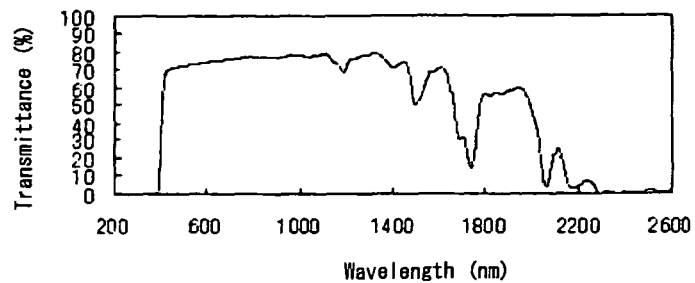
FIG. 13 is a near-infrared spectrum chart of Comparative Example 5.

0.15 parts by weight of a diimmonium compound (IRG-022, made by Nippon Kayaku Co., Ltd.) was added to 100 parts by weight of a high-refractive resin (thiourethane resin MR-7, made by Mitsui Chemicals, Inc.) as a base resin. This mixture was subjected to cast molding without using a polarizing film to obtain a polarized lens. FIG. 13 shows a near-infrared spectrum chart of this spectacle lens (lens thickness: about 2.3 mm).

The average transmittance of infrared rays in the wavelength range of 780-2500 nm as calculated based on the results of FIG. 13 was 49.06%. (The average transmittance of infrared rays in the wavelength range of 780-1700 nm was 72.06%.) This indicates that no desired infrared absorbing properties were obtained because the infrared absorbing agent reacted with sulfur components and deteriorated.

Comparative Example 6

Figure 14:
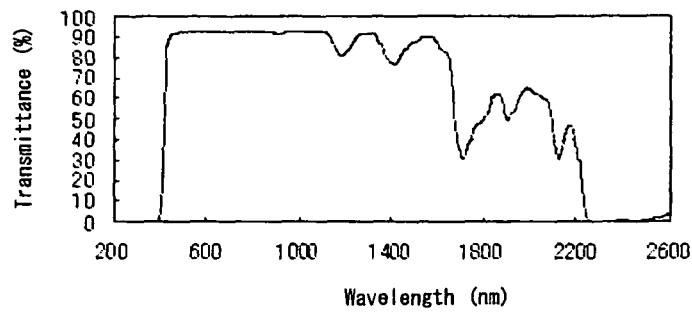
FIG. 14 is a near-infrared spectrum chart of Comparative Example 6.

Using allyl diglycol carbonate (CR-39) as a base resin as in Comparative Example 2, cast molding was conducted without adding an infrared absorbing agent and without using a polarizing film to obtain a spectacle lens. FIG. 14 shows a near-infrared spectrum chart of this polarized spectacle lens (lens thickness: about 2.0 mm).

The average transmittance of infrared rays in the wavelength range of 780-2500 nm as calculated based on the results of FIG. 14 was 61.61%. (The average transmittance of infrared rays in the wavelength range of 780-1700 nm was 86.60%.) This indicates that this lens has no infrared absorbing ability.

Comparative Example 7

Figure 15:
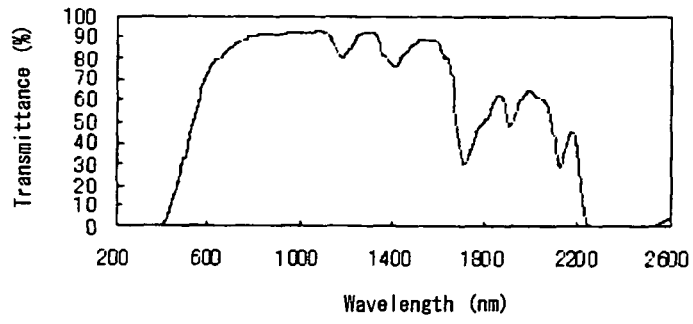
FIG. 15 is a near-infrared spectrum chart of Comparative Example 7.

In the same manner as in Comparative Example 2, 0.13 parts by weight of a diimmonium compound (IRG-022, made by Nippon Kayaku Co., Ltd.) was added to 100 parts by weight of allyl diglycol carbonate (CR-39) as a base resin. This mixture was then subjected to cast molding without using a polarizing film to obtain a spectacle lens. FIG. 15 shows a near-infrared spectrum chart of this spectacle lens (lens thickness: about 2.0 mm).

The average transmittance of infrared rays in the wavelength range of 780-2500 nm as calculated based on the results of FIG. 15 was 60.95%. (The average transmittance of infrared rays in the wavelength range of 780-1700 nm was 85.94%.) This indicates that no desired infrared absorbing properties were obtained because the infrared absorbing agent reacted with IPP, which is a peroxide catalyst, and deteriorated.

From the results of FIGS. 1 to 15, it is apparent that only the lenses formed by adding an infrared absorbing agent to a polyurethane resin obtained by addition polymerization of a prepolymer produced by reacting a polyisocyanate with a polyhydroxy compound, and an aromatic polyamine show excellent infrared absorbing properties with no deterioration or decomposition of the infrared absorbing agent.

What is claimed is:

1. An infrared absorbing spectacle lens made of a resin composition comprising:
a polyurethane resin composition obtained by addition polymerization of a prepolymer and an aromatic polyamine,
wherein said prepolymer is a reaction product of a polyisocyanate and a polyhydroxy compound,
wherein said resin composition contains an infrared absorbing dye that absorbs infrared rays having wavelengths over the entire range of 780 to 2500 nm which is added in such amount that the average transmission of infrared rays having wavelengths in the range of 780 to 2500 nm is not more than 30%, and
wherein said infrared absorbing dye is selected from the group consisting of:
(1) N,N,N',N'-tetrakis(p-substituted phenyl)-p-phenylene diamines, benzenes, and their aluminum salts and diimmonium salts; and
(2) Bis-(p-dialkylaminophenyl)[N,N-bis(p-dialkylaminophenyl)p-amino-phenyl]aminium salts.

2. The infrared absorbing spectacle lens of claim 1 further comprising an ultraviolet absorbing agents capable of absorbing ultraviolet rays having wavelengths of not more than 400 nm.

3. The infrared absorbing spectacle lens of claim 1 wherein said polyisocyanate is selected from the group consisting of 4,4'-methylene-bis(cyclohexylisocyanate) and isophorone diisocyanate.

4. The infrared absorbing spectacle lens of claim 1 wherein said polyhydroxy compound is a polyether diol or a polyester diol having an average molecular weight of 700-1200, or a mixture thereof.

5. The infrared absorbing spectacle lens of claim 1 wherein the polyisocyanate and the polyhydroxy compound are added in such amount that the reaction molar ratio (NCO/OH) is 2.5 to 4.0 and the NCO content of the polyurethane prepolymer obtained is 7.0 to 14.0%.

6. The infrared absorbing spectacle lens of claim 1 which is selected from the group consisting of a transparent lens, a colored lens and a polarized lens.

7. The infrared absorbing spectacle lens of claim 1 which is selected from the group consisting of a sunglass lens, polarized spectacle lens and a shield lens for use in goggles.

8. The infrared absorbing spectacle lens of claim 1, wherein the infrared absorbing dye is added in an amount of 0.1 to 10 parts by weight.

\* \* \* \* \*